United States Patent [19]

Traut

[11] 3,777,048
[45] Dec. 4, 1973

[54] MOLDING PROCESS FOR SPLICING CABLE AND PRODUCT FORMED THEREBY

[75] Inventor: Richard T. Traut, Danielson, Conn.

[73] Assignee: Kaiser Aluminum & Chemical Corporation, Oakland, Calif.

[22] Filed: Sept. 22, 1971

[21] Appl. No.: 182,758

[52] U.S. Cl. ............... 174/73 R, 156/49, 174/84 R
[51] Int. Cl. ....................... H02g 15/08, H02g 1/14
[58] Field of Search ................... 174/73 R, 73 SC, 174/84 R, 88 R, 90, 110 PM, 120 SC; 156/49

[56] References Cited
UNITED STATES PATENTS

| 3,573,210 | 3/1971 | Furusawa et al. | 174/73 SC X |
| 3,612,746 | 10/1971 | Sankey | 174/73 R |

FOREIGN PATENTS OR APPLICATIONS

| 1,911,211 | 9/1970 | Germany | 174/84 R |
| 1,911,212 | 9/1970 | Germany | 174/84 R |
| 1,191,129 | 5/1970 | Great Britain | 174/84 R |
| 15,467 | 7/1969 | Japan | 174/84 R |

Primary Examiner—Laramie E. Askin
Attorney—Paul E. Calrow

[57] ABSTRACT

A substantially void-free cable splice for high voltage lines wherein the ends of two electrical cables insulated with cross-linked polyethylene are conductively connected by a metallic connector, the cable ends and connector then being coated with a semi-conductor shielding layer of cross-linked polyethylene having a smooth surface and having conductive particles, advantageously carbon particles, dispersed through such layer, and an insulating layer of cross-linked polyethylene monolithically bonded to the shielding layer and to the insulating layer on each cable. In a method of forming the splice, the connector-cable joint made up of abutted cable ends and a metallic connector is first wrapped with cross-linkable polyethylene tape, a close-fitting pressure-resistant cover is applied and the overall joint assembly thus formed heated in two stages, (a) to fuse the shielding polyethylene to a semi-liquid state and to drive off any occluded or formed gas, and (b) to cross-link the shielding polyethylene tape and bond it to any adjacent cross-linked polyethylene material. The resultant shielding layer and joint are cooled and then wrapped with additional cross-linkable polyethylene tape to form an outer insulating layer. The final joint assembly is next heated in a further multi-stage process, and then cooled to recover the final monolithic cable splice desired.

11 Claims, 5 Drawing Figures

MOLDING PROCESS FOR SPLICING CABLE AND PRODUCT FORMED THEREBY

BACKGROUND OF THE INVENTION

This invention relates to a splice for an insulated, high voltage, electrically conducting cable and to a method for making such a splice; and more particularly it relates to a splice monolithic with such a cable which is insulated with cross-linked polyethylene and to a method of making a cable joint wherein the insulation portion of the joint is made integral or monolithic with such cable insulation.

The prior art has proposed a wide variety of splices for both insulated underground and overhead cable, some of which are illustrated in U.S. Pat. No. 2,463,231, 2,967,795 and 3,467,561. Still lacking, however, is a relatively inexpensive splice which will have a long life, is substantially free of corona effects and substantial or excessive voltage stresses, is resistant to attack by underground environment, has low loss while still exhibiting th same basic electrical and physical characteristics as the original cable insulation and while having an intimate and strong bond therewith.

It has been found quite difficult, for instance, to eliminate insulation voids in an insulated cable splice, and the presence of such voids has resulted, among other things, in corona discharge and other weaknesses. The art has previously proposed to wrap tape, especially rubber tape, tightly and without wrinkles about the bundles of conductors making up the cables to eliminate such voids, but overheating or separation of layers has often resulted in such wrapped joints. Also, in wrapped joints it has been difficult to obtain in the shielding layer a substantially uniformly smooth shielding surface. Any protrusion of shielding layer material into the insulation material has been found to cause points of high electrical stress which are likely sites for dielectric failure. The prior art has also proposed wrapping the joint with a heat-fusible tape and then heating the tape to a fusion condition to provide a more uniform tape structure, but removal of all air of gas bubbles and elimination of all voids in these wrappings has been quite difficult to accomplish by use of this procedure. One serious disadvantage resulting from the presence of such voids is that the voids build up varying electrical potentials that induce or aggravate corona discharge and ultimate deterioration and rupture of the cable joint insulation.

The present invention provides a splice substantially free of voids, is generally fully integrated with the original cable insulation, exhibits low dielectric loss, is substantially free of excessive or substantial voltage stresses and corona effect and is well suited to field application and to underground cable use with long life and good resistance to attack in such environment. The specific thermal resistivity of the cross-linked polyethylene splice insulation is equal to that of the same type of cable insulation and therefore the temperature of the connector will always be somewhat less than that of the cable conductor due to the slightly greater circumferential dimension or radiating surface of the splice. In the present invention a molecular bonding is achieved between the splice and the insulation. This produces a strong joinder of spliced elements and the physical ruggedness of the overall joint is excellent. A particular advantage of this invention is that adverse effects caused by taping tension are avoided. In addition, the cost of the splice materials is much less than that of known, conventional splices, and considerably less taping skill and time are required in making the splice of this invention, resulting in further economy. Furthermore, the electrical strength characteristics of the splice of this invention are in general at least as good as that of the cable itself.

SUMMARY OF THE INVENTION

The present invention concerns a splice for a high voltage, electrically conducting cable, particularly a cable insulating with cross-linked polyethylene and having a shielding layer strongly bonded to or integral with the cable insulation. The invention also provides a method for making such a cable splice which can be readily effected in the field and one which is strong and exhibits little or no corona effect and substantially no excessive voltage stresses. The finished cable joint is provided with a shielding layer and an insulated covering therefor which is, in effect, integral with the cross-linked polyethylene insulation of the cable. The electrical and physical characteristics of the final splice are substantially the same as those of the spliced cable sections with the splice being fully capable of withstanding the high voltages of the cables themselves.

The splice or joint is prepared by removing insulation from the cable ends, in the conventional manner, and leaving a small length of the usual cable shielding layer exposed. A metal conductor-connector is applied in the usual way over both of the exposed cable ends and serves as the immediate medium for holding the cable ends together in conductivity relationship. This connector can be applied in any suitable fashion, such as by welding or brazing or by using a compressive connection. If desired, the cable ends themselves can be brazed or welded directly to each in the conventional manner.

A semi-conducting shielding layer is then applied over the joint area by wrapping the connector and a portion of the exposed shielding layer carried by the cable ends with a tape of semi-conducting polyethylene material that consists essentially of uncured, cross-linkable polyethylene having carbon particles dispersed therethrough in the known way. Such a tape is known to the art and is readily available commercially. This tape is suitably wrapped about the elements of the joint to form a shielding layer that is of the desired and conventional thickness well known in the high voltage conductor art. The layer of shielding tape is suitably provided with a pressure-resistant or holding cover, e.g., a winding of Teflon tape, then a winding of another pressure-resistant tape such as one made of Mylar (ethylene terephthalate) or of glass fibers, etc. The taped joint is next covered with a metal mold and heated in two stages. In the first stage, the joint is heated to a temperature of from 125° C. to 135° C. for about one and one-half to two hours to cause the polyethylene shielding tape to fuse and to drive off any occluded or formed gases. It is thereafter cooled down to ambient temperature and subsequently reheated in the second stage. In the second heating stage the fused tape is heated at a higher, cross-linking temperature of from 160° C. to 180° C. for about one hour to effect cross-linking of the polyethylene, after which the now monolithic, void-free mass of cross-linked polyethylene with dispersed carbon is cooled to ambient or room temperature. The polyethylene tape retains the dispersion of conductive particles and all of its shielding characteristics. The tape is now present as a homogeneous layer of cross-linked polyethylene with dispersed carbon. The holding tape or tapes, e.g., polytetrafluoroethylene, etc., are then removed to expose the cross-linked polyethylene shielding layer. The surface of this layer is next smoothed by sanding, or the like, so as to be free of projections and permit its blending smoothly into the pencilled portions of the cables. The partially finished cable splice is now ready for the application of the outer insulating layer thereto.

At this point, the colled, shielded joint is wrapped with uncured, cross-linkable polyethylene tape to at least as great a diameter as that of the original cable insulation by the usual practices in order to provide an appropriate layer of insulation for the joint. A protective, nonfusible and compatible coating can be placed over the layer of wound insulating tape, such a coating being, for example, a tubing of fluorinated ethylene propylene, which is then heat-shrunk to closely confine the taped joint. Alternately a half-lapped winding of polytetrafluoroethylene (Teflon) could be applied and used to provide separation of a pressure-resistant tape from the polyethylene insulating layer when the latter is heated and fused. This protective coating can be advantageously reinforced by being wound with Mylar tape or glass reinforced tape, or both, in a half-lap arrangement, the Mylar or glass tape having higher pressure-resistance. After the last-mentioned insulating layer and protective tape have been emplaced, the splice is heated while being held within a metal mold, to fuse the uncured polyethylene insulating tape layer to bring to and drive from the exterior surface of the insulating tape occluded or formed gases and to effect cross-linking and curing of the polyethylene insulating tape. The processed splice is thereafter cooled and coated with a layer of semi-conducting paint and then with a wrapping of half-lapped semi-conducting tape that can also bear further coatings, if desired. This semi-conducting tape can comprise copper tape of helically disposed copper wires in combination with a corrugated polyester tape and there can then be applied an overall conventional polyvinyl chloride, water-resistant jacket.

Heating of th insulation layer of the cable splice is advantageously effected in three stages, the splice being heated in the first stage at a temperature to cause fusion of the polyethylene. In the second stage, the temperature is increased to form a more fluid or mobile mass and to drive out all gas bubbles or gaseous inclusions, and in the third stage heating is continued at a temperature lower than that of the second stage but higher than the fusion temperature of the first stage, to effect cross-linking of the polyethylene.

The three-stage heating for the insulation layer is carried out as follows: In the first stage, th wrapped joint is heated to fuse at a temperature of from 110° C. to 120° C. for from two to three hours. In this heating stage, the fused polyethylene tends to swell and, since it is confined by a pressure-resistant covering, a considerable pressure is developed by the polyethylene against the pressure-resistant covering. In the second stage, the temperature is increased to from 138° C. to 142° C. for from two to three hours, whereby voids are closed and/or gaseous inclusions are driven to the exterior surface of the insulating layer and out of the splice. At this time, no substantial cross-linking will have occurred so that the gases can readily surface and be driven away from the heated insulating layer. Since the outer surface of the splice is hotter than the innermost portions, cross-linking will begin at the outer face and progress inwardly. Thus, the above two stages of heating have been found advantageous in developing the necessary fluidity and pressure to drive out gases and eliminate voids in the insulating layer that is usually thicker than the shielding layer before there is sufficient cross-linking at the surface of the insulating layer to form a barrier to the egress of the gaseous inclusions, cross-linked polyethylene not being fusible under the conditions employed herein. In the third stage, then, the temperature is reduced as described above but maintained sufficiently high, suitably at from 130° to 135° C. and for a sufficient period of time, on the order of from four to eight hours, to effect substantially complete cross-linking of the void-free polyethylene, and to form a splice essentially monolithic in itself and with the original cable insulation of the adjacent and spliced cable sections. The insulation of the original commercially available cable is usually incompletely cross-linked. That is to say, in the commercially available cross-linked polyethylene-insulated cable, cross-linking is generally from about 70 percent to 95 percent complete when subjected to the splice of the instant invention. Therefore, when the splice is heated in the present invention to cross-link the polyethylene of the splicing tapes, some of this reaction takes place in the adjacent original cable insulation, and a molecular, or very strong, bond results between the splice insulation material and the original and adjacent cable insulation.

The final splice assembly comprises a conducting core, which can be one or more, usually a plurality of wire strands, a shielding layer disposed about such core and consisting essentially of cross-linked polyethylene having carbon particles dispersed therein, and an insulating layer of cross-linked polyethylene applied to and integrally bonded to such shielding layer and to the like adjacent original insulation of the joined cables. The cross-linked polyethylene component of the cables and the joint is substantially monolithic or homogeneous. The shielding layer of the splice is also monolithically bonded to a like shielding layer on the cables being spliced.

The heating required to effect the aforesaid fusion and cross-linking, etc., of the polyethylene tapes can be effected in various ways. For example, the protectivly coated uncured polyethylene can be enclosed in a metal mold and then wrapped with a flexible heating tape or blanket of known type, such as fiberglass or a silicone rubber insulated heating tape. Current is applied to the tape to heat the tape and the elements of the splice encompassed by the heating tape to the temperatures and for the time periods described herein. A suitable sensor is inserted in the usual fashion within the metal mold to regulate or control the temperature of the mold, etc. Any desired and suitable alternative methods and means of supplying heat to the mold can be employed, such as a totally enclosed forced air oven, or other means.

Heating of the non-cross-linked or cross-linkable polyethylene to fusion or a semi-liquid state results in expansion of the material. Confinement by means of the pressure-resistant coating results in an amount of autogenously developed pressure in the splice area which aids in the driving off of gases and the elimination of voids in the shielding and insulation layers.

It has been found that a smooth surface on the shielding layer, and the two separate multi-stage heating procedures, have resulted in excellent splice characteristics according to this invention. The smooth surfaces tend to avoid entrapment of air or gas bubbles and each of the heating procedures appears to effectively force or drive to the exterior surface of the particular ayer being heated at a given time any gas which may be formed or which may still be entrapped in the wrapped tapes being treated. The exterior surface of the polyethylene splice can be sanded or otherwise smoothed prior to application of an exterior shielding layer.

The splice of this invention is suitable for joining cross-linked polyethylene insulated cables designed for use at a potential of at least 15 KV. and is suitable for use at much higher voltages, as will be described below. It is particularly useful in the elimination of voids in the joint shielding and insulation materials.

It has been observed that the presence of voids in the shielding and insulating material in the splice zone is very detrimental to good performance of a splice and the cable embodying such a splice. It has been further observed that there is a tendency for such voids to exist or form, especially at the interface between the insulation layer and the shielding layer or the pencilled surface, that is, between any two joining surfaces. In the final article of this invention, these surfaces are not distinguishable or are relatively indistinguishable as such. The polyethylene cross-linkage is believed to be a molecular bonding between the component layers, and the voids which may have formed or existed at what may be termed the initial interfaces are eliminated. Whereas it has been noted that early failure and excessive corona effects ensue when the voids exist, it has been found herein that such voids can be eliminated or prevented by effecting a smooth exterior surface on the shielding layer and the pencilled portion of the original insulation and by application of suitable pressure and heat, as described, to ensure uniform processing and bonding to the insulation layer applied at the splice area.

BRIEF DESCRIPTION OF THE DRAWINGS

This invention and preferred modes of carrying it out will be set forth and illustrated in the more specific description below, and with reference to the annexed drawings wherein.

DETAILED DESCRIPTION OF THE INVENTION

Figure 1:
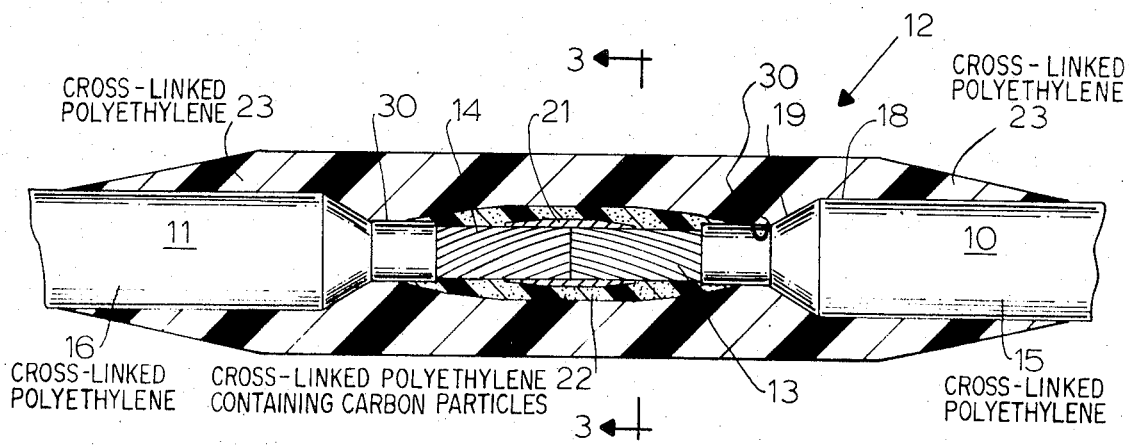
FIG. 1 is a longitudinal view, partially cut away, of a splice according to the present invention, showing it with reference to both cable sections which are being joined.

The invention will be partially described in connection with the embodiment shown in FIGS. 1 through 3, wherein two cables 10 and 11 are to be joined by a splice 12. These cables are of identical construction and each comprises a core of aluminum wire conductor strands 13 and 14, respectively, surrounded by shielding layers 30 and finally encompassed within original insulating layers 15 and 16, respectively. This original insulation is cross-linked polyethylene in each instance and the shielding layers 30 are likewise of cross-linked polyethylene containing dispersed carbon particles. The cross-linking of the polyethylene making up layers 15, 16 and 30 is less than complete, as is well known with respect to cables of this type which are presently available in commerce, the cross-linking being at least about 70 percent, but usually not over about 95 percent, complete, so that a portion is available to advantageously react with the uncured polyethylene of the splice 12 during the proper heating step, as will be described.

In preparing the splice, the insulation, including the shielding layer, is removed from the end of each cable, being cut back a suitable distance. The ends of such insulation are pencilled in a manner well known in the art, leaving a portion of the shielding layer 30 exposed. That is to say, the end of each insulating coating is tapered from the exterior surface 18, for instance, as shown at 19 in FIG. 1, down to the surface of the corresponding shielding layer 30. Both cables are pencilled in this manner and the pencilled or tapered surface in each instance is sanded to smoothness.

A metal conductor-connector 21 is frictionally slip-fitted over the cable ends and the end surfaces of the conductors in cables 13 and 14 are brought into full abutting position within connector 21. Connector 21 is then welded or brazed in a well-known manner to the conductors 13 and 14 in current-conducting relationship. An uncured polyethylene semi-conducting shielding tape, used to form an overall layer 22 and containing uniformly dispersed carbon particles, is next wrapped around the joint and the spliced conductors extending from about one-half inch from the edge of the tapered portion of insulation 15 of the one cable to a point spaced about one-half inch from the edge of the tapered portion of insulation 16 of the other cable. The polyethylene tape is wrapped around the joint to a suitable depth, for instance, a depth or thickness of from about 75 mils to about 150 mils. A layer of polytetrafluoroethylene (Teflon) tape is then spirally wrapped around the uncured polyethylene layer or layers and a layer of Mylar (ethyleneterephthalate) tape is spirally wrapped over the Teflon to confine the polyethylene and to prevent leakage when the polyethylene is fused during the subsequent heating step. A mold, suitably a divided aluminum metal mold, such as one made from an aluminum conduit cut in half lengthwise, is then placed over the Mylar-wrapped joint and a wrapping of flexible heating tape is applied over the mold sections to hold them in place about the cable splice assembly. It has also been found helpful in conserving heat during the splicing operation to wrap Fiberglas or similar heat-insulating material around the cables beyond the joint area. A sensor is next inserted within the mold to control the heating, and current is applied through the heating tape under the control of the sensor to heat the joint to a temperature of about 125° C. to 135° C. This temperature is maintained for about one and one-half to two hours. The polyethylene shielding tape is fused under these conditions and then forms a homogenous mass 22 with the carbon particles uniformly distributed therethrough as shown in FIG. 3. The mass 22 is allowed to cool and again heated in the same fashion as in the first stage, but at a higher temperature of from 160° C. to 180° C. for about one hour. During this second heating stage, the cross-linking of the material of layer 22 takes place at the same time this layer bonds itself to the shielding layers 30 of the joined cable sections. The heating tapes, mold and Mylar and Teflon tapes are now removed and the shielding layer allowed to cool for about one-half hour. The shielding layer of the splice is now sanded to a smooth finish.

Figure 2:
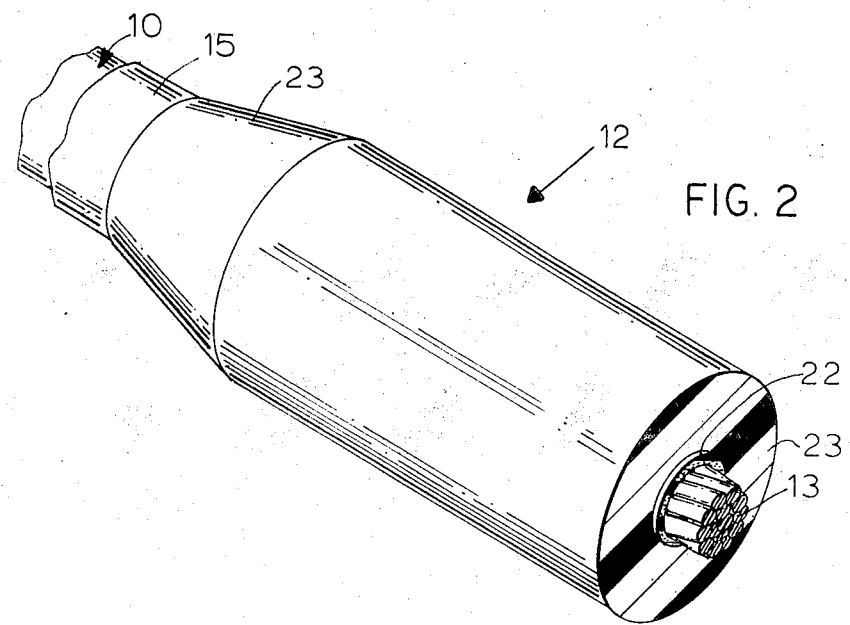
FIG. 2 is a perspective view of a splice partially cut away and made according to the present invention.

The finish semi-conductor layer 22 is then wrapped with uncured cross-linkable polyethylene insulating tape in overlapping arrangement, and this wrapping that forms insulation layer 23 is extended up over the pencilled portion and over a sufficient portion of the outer surfaces of cables 10 and 11, in FIG. 1, to secure a good connection or bonding and integration of layer 23 with the cable insulations 15 and 16. Prior to joining the two cables, a heat-shrinkable fluorinated ethylene propylene tubing is slipped over the one cable and after the joint has been overwrapped with the uncured polyethylene insulating tape of layer 23, the tubing is slipped over the splice area and is shrunk thereto, using a heat gun, so that the tubing generally conforms to the splice shape and is adapted to hold the later-fused polyethylene in place. The tubing further acts as a separator and provides a smooth finished surface to the final splice insulation. Mular tape and glass-reinforced tape are then wrapped over the tubing to form a pressure container for the splice materials.

A further mold, e.g., a second aluminum conduit split lengthwise and the sections of which are larger than those of the first mold, is then fitted over the splice wrapped as described and is clamped thereto. A temperature control sensor is affixed to the outer surface of this second aluminum mold at an intermediate point of about 15 inches in from one end of the mold, where the mold is about 30 inches in length. The mold is now overwrapped with a flexible heating tape, and fiberglass or asbestos insulation is preferably wrapped around the entire splice area to conserve heat. The mold and splice are heated by flow of current through the heating tape. In the first stage of heating, the mold is heated to a temperature of from 110° C. to 120° C. from two to three hours, then the temperature is increased to from 138° C. to 142° C. and held at this second temperature for approximately two to three more hours, and, thereafter, the mold is maintained at from 130° C. to 135° C. for about 4 to 8 hours. The assembly is then allowed to cool for at least 2 hours before opening of the mold, after which the heating tapes are removed, the mold is taken off, and the glass-reinforced and Mylar tapes and fluorinated ethylenepropylene jacket or tubing are removed.

Figure 3:
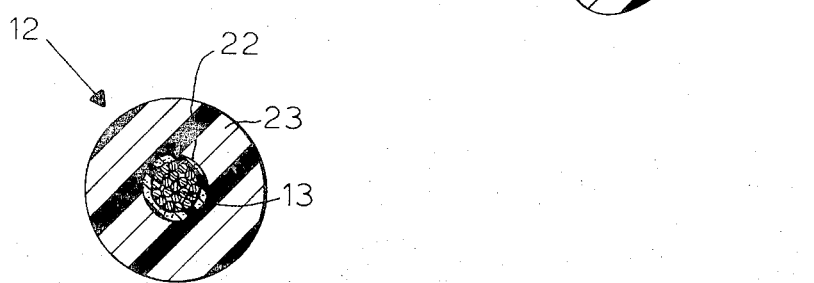
FIG. 3 is a cross-sectional view taken generally along line 3—3 of FIG. 1.
Figure 4:
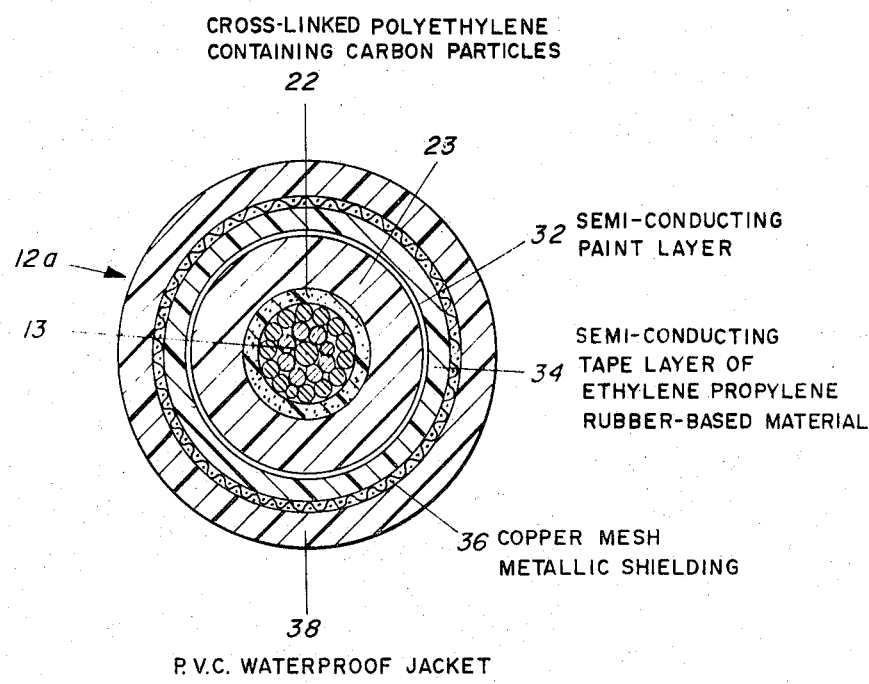
FIG. 4 is a cross-sectional view of the cable splice of FIG. 3 with additional covering layers added.
Figure 5:
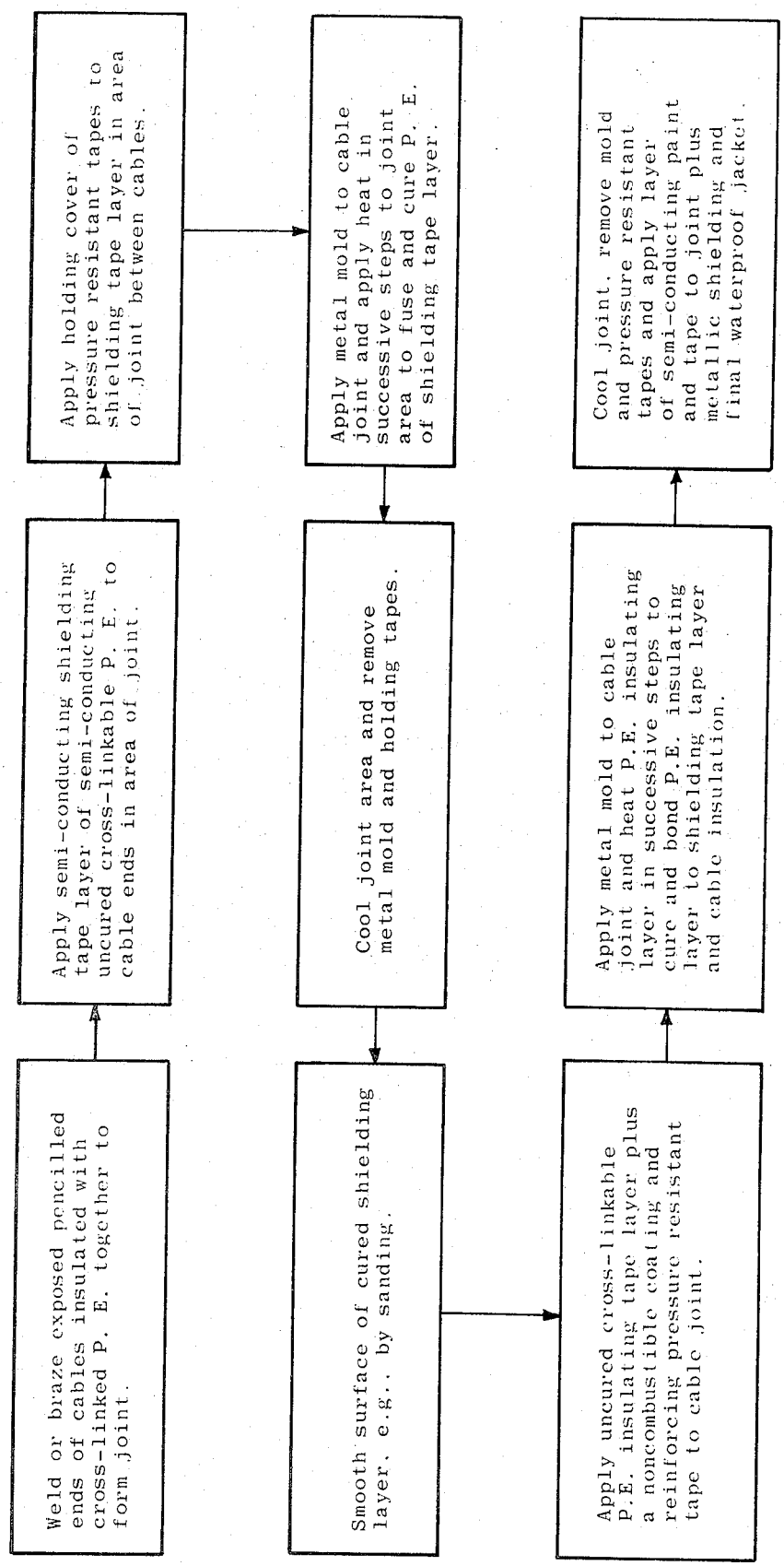
FIG. 5 is a flow sheet illustrating the steps of the molding process for splicing cable.

The final splice appears in cross-section, as shown in FIG. 3, and comprises the central conductor core or assembly 13, surrounded by shielding layer 22 of cross-linked polyethylene containing uniformly dispersed carbon particles and integrated and bonded to cable layers 30. Layer 22 in turn is surrounded by a cross-linked polyethylene insulating layer 23 that has been integrated with and bonded to cable insulation layers 15 and 16. The outer surface of the splice is now smoothed, e.g., by sanding. The splice area 10 itself and adjacent cable insulation surfaces can then be shielded with a special semi-conducting compound comprising a solvent-based, carbon-filled paint 32 which is commercially available in liquid form and can be painted onto the insulation surface. Thereafter as shown in FIG. 4, there can be applied in completing the splice 12a, a half-lapped layer of a commercially available semi-conducting tape 34 such as ethylene propylene rubber-based semi-conductor tape followed by a layer of copper mesh tape 36, also commercially available, and applied as a layer with half-lapping. Waterproof jacketing 38 is thereafter applied, and this can comprise a polyvinyl chloride tape, an epoxy resin-impregnated fabric tape, or ethylene propylene rubber tape, for example.

In an example of a splice according to this invention a number of pairs of aluminum-core cables were joined as described above. The commercially available semi-conducting tape used in these tests was made of electrical grade polyethylene as compounded with dicumyl peroxide, a stabilizer and about 30 percent by weight of carbon semi-conductive black and has the following typical properties: density, 1.07–1.16; tensile strength, at least 1,800 psi; at least 100 percent elongation; after 7 days' aging at 150° C., at least 75 percent of original tensile strength and at least 100 percent elongation; not over 5 mg per square inch moisture absorption; brittle temperature, not over 30° C.; and volume resistivity after press cure on the order of 100 ohms per cm. at 23° C. and 800 ohms per cm. at 90° C.

The commercially available polyethylene insulation tape in these tests is made of electrical grade polyethylene resin of the following typical properties: density, 0.915–0.925; tensile strength, at least 2,000 psi; at least 300 percent elongation; tensile strength and elongation after aging 7 days at 136° C. are 75 percent of original values; not over 5 mg. per sq. in. mechanical moisture absorption; and brittle temperature, not over 75° C. When cured, such polyethylene typically exhibits a dielectric strength of at least 450 volts per mil; a dielectric constant of not over 2.5 at 60 Cps; change in capacitance after 1 to 14 days of not over 2 percent; and a dissipation factor not over 0.5 percent at 60 Cps.

Five such splices were subjected to 21 KV and 28 eight-hour cycles to 90° C. conductor temperature, followed by 24 eight-hour cycles to 130° C. conductor temperature at 21 KV. Voltage was raised to 41 KV for 1,009 hours during which 60 eight-hour cycles at 130° C. conductor temperature were completed. No failures occurred in any of these splices. One such splice was subjected to corona level measurement as set out in the Table below:

TABLE

CORONA LEVEL MEASUREMENT OF MOLDED 35 KV SPLICES

Discharge Measured in Picocoulombs

60 Hz

| KV | Cable | 35 KV Molded Splice No. 10 |
|---|---|---|
| 20 | 0 | 0 |
| 25 | 2 | 0 |
| 30 | 5 (Initiation) | 4 |
| 35 | 85 (Air Corona) | 3 |
| 40 | — | 3 |
| 42 | — | — |
| 45 | — | 3 |
| 40 | — | 3 |
| 36 | — | 3 |
| 35 | — | 3 |
| 30 | 3 (Extinction) | 3 |
| 28 | — | 3 |
| 25 | 0 | 3 |
| 21 | 0 | 0 |

In the above Table, by the term "Initiation" is meant the voltage level at which the discharge level reaches 5 picocoulombs and by "Extinction," the voltage level at which the discharge level drops below 5 picocoulombs. It can be seen that the discharge level in the splice made according to this invention and with properly smoothed juncture surfaces was quite satisfactory.

The above specific description and drawings have been given for purposes of illustration only; and variations and modifications can be made thereto by those skilled in the art, without departing from the spirit and scope of the appended calims. For instance, in the above description, heating was effected by means of a wrapping of conductive tape and passage of electrical current therethrough. Alternatively, there can be used radiant heating or heating with steam or any other desired and suitable heating means or method. Where Mylar tape is employed as described, it can be substituted for by glass-reinforced tape or both types can be used.

Having now described the invention,
What is claimed is:

1. A cable splice assembly substantially free of voids and adapted for use with high voltages comprising abutting exposed ends of two high voltage electrical cables, each such cable being covered with a shielding layer of partially cross-linked polyethylene containing conductive carbon particles dispersed therethrough together with an original, outwardly disposed insulating layer of partially cross-linked polyethylene, a metallic connector covering and conductively connected to the exposed ends of the cables, a smooth surfaced, semiconductor shielding layer of cross-linked polyethylene containing conductive carbon particles dispersed therethrough surrounding said cable ends and said connector as well as portions of the shielding layer of polyethylene of each of said cables within said splice assembly, and a cross-linked polyethylene insulating layer surrounding said applied shielding layer and integrally bonded thereto and to said original insulating layer on each cable with the interfaces between the respective layers being substantially free of voids.

2. A cable splice assembly as in claim 1 including a final multi-component wrap with a waterproof jacket covering the splice area and adjacent cable surfaces.

3. A cable splice assembly as in claim 2, wherein the final wrap includes a shielding layer of copper mesh.

4. A cable splice assembly as in claim 3, wherein the final wrap includes layers of semi-conducting material disposed beneath the shielding layer of copper mesh.

5. Method of making a cross-linked polyethylene-coated splice for at least two electrical cables covered by cross-linked polyethylene insulation coatings comprising:
   a. removing said insulation coating from the end of each of said cables,
   b. applying a conductor-connector to connect said cable ends in conducting relationship,
   c. wrapping cross-linkable polyethylene semi-conducting shielding tape around said connector and said cable ends to form a shielding layer,
   d. applying a confining pressure-resistant cover over said wrapped shielding layer of tape,
   e. heating said cover and wrapped shielding layer to fuse and effect cross-linking in said polyethylene shielding tape and to drive off gases to form a monolithic shielding layer free of voids,
   f. cooling and forming a smooth exterior surface on said shielding layer,
   g. wrapping said smooth surface shielding layer and a portion of each said insulation coatings with cross-linkable polyethylene insulating tape to form an insulating splice coating,
   h. applying a contining cover over said wrapped second-mentioned cross-linkable polyethylene tape,
   i. heating said confined cross-linkable polyethylene insulating tape to fuse and then to drive off gases,
   j. then heating said polyethylene tape to effect cross-linking of said cross-linkable polyethylene insulating tape and to cure and monolithically bond the same to adjacent surfaces of cross-linked polyethylene,
   k. cooling said heated splice to ambient temperature and removing said confining covering to recover a substantially monolithic splice homogeneous with said original cable insulation.

6. Method as in claim 5 wherein said cross-linkable polyethylene tape making up the shielding layer is heated in a first stage at a temperature of from 125° to 135° C. for a selected period of time.

7. Method as in claim 5 wherein said cross-linkable tape insulating layer is heated to fuse in a first stage at a temperature of from 110° C. to 120° C. for from two to three hours.

8. Method as in claim 5 wherein said shielding layer is heated in a second stage and while confined at a temperature of from 160° C. to 180° C. for about 1 hour.

9. Method as in claim 5 wherein said insulating layer is heated in a second stage at a temperature of from 138° C. to 142° C. for from two to three hours to drive off voids.

10. Method as in claim 5 wherein said insulating layer is heated in a third stage at a temperature of from 130° C. to 135° C. for from 4 to 8 hours, to cure and effect monolithic bonding.

11. Method as in claim 5 wherein after said second-mentioned cooling, a smooth surface is formed on said insulation coating, a layer of semi-conducting paint is applied thereover, then a layer of semi-conducting tape, a metallic shielding and a protective jacket over said metallic shielding.

* * * * *

UNITED STATES PATENT OFFICE
CERTIFICATE OF CORRECTION

Patent No. 3,777,048            Dated December 4, 1973

Inventor(s)  Richard T. Traut

It is certified that error appears in the above-identified patent and that said Letters Patent are hereby corrected as shown below:

Column 2, Line 12, "insulating" should be --insulated--

Column 2, Line 32, "conductivity" should be --conductive--

Column 3, Line 12, "colled" should be --cooled--

Column 3, Line 56, "th" should be --the--

Column 5, Line 9,  "ayer" should be --layer--

Column 7, Line 28, "Mular" should be --Mylar--

Column 9, Line 11, "calims" should be --claims--

Column 10, Line 17, "contining" should be --confining--

Signed and sealed this 16th day of April 1974.

(SEAL)
Attest:

EDWARD M. FLETCHER, JR.             C. MARSHALL DANN
Attesting Officer                    Commissioner of Patents